United States Patent
Heufelder et al.

(10) Patent No.: US 12,005,645 B2
(45) Date of Patent: Jun. 11, 2024

(54) PRINTHEAD CLEANING DEVICE FOR A 3D PRINTER, 3D PRINTER COMPRISING A PRINTHEAD CLEANING DEVICE, USE OF THE PRINTHEAD CLEANING DEVICE AND METHOD FOR CLEANING A PRINTHEAD OF A 3D PRINTER

(71) Applicant: ExOne GmbH, Gersthofen (DE)

(72) Inventors: Christian Heufelder, Augsburg (DE); Carmen Brockmeier, Fischach (DE); Katrin Stalla, Wertigen (DE); Edmund Klundt, Augsburg (DE); Roland Ladewig, Windeby (DE)

(73) Assignee: ExOne GmbH, Gersthofen (DE)

( * ) Notice: Subject to any disclaimer, the term of this patent is extended or adjusted under 35 U.S.C. 154(b) by 0 days.

(21) Appl. No.: 17/614,476

(22) PCT Filed: May 26, 2020

(86) PCT No.: PCT/EP2020/064589
§ 371 (c)(1),
(2) Date: Nov. 26, 2021

(87) PCT Pub. No.: WO2020/239774
PCT Pub. Date: Dec. 3, 2020

(65) Prior Publication Data
US 2022/0227054 A1    Jul. 21, 2022

(30) Foreign Application Priority Data
May 27, 2019    (DE) ..................... 20 2019 102 983.8

(51) Int. Cl.
*B29C 64/30*    (2017.01)
*B22F 10/14*    (2021.01)
(Continued)

(52) U.S. Cl.
CPC .............. *B29C 64/30* (2017.08); *B22F 10/14* (2021.01); *B22F 12/53* (2021.01); *B29C 64/165* (2017.08);
(Continued)

(58) Field of Classification Search
None
See application file for complete search history.

(56) References Cited

U.S. PATENT DOCUMENTS

| 5,790,146 A | 8/1998 | Anderson et al. |
| 2002/0079601 A1 | 6/2002 | Russell et al. |

(Continued)

FOREIGN PATENT DOCUMENTS

| CN | 107364125 A | 11/2017 |
| DE | 102009056687 A1 | 6/2011 |

(Continued)

OTHER PUBLICATIONS

International Search Report for International application No. PCT/EP2020/064589, mailed on Aug. 3, 2020, 4 pages (For informational purposes only).

(Continued)

*Primary Examiner* — Timothy Kennedy
(74) *Attorney, Agent, or Firm* — VIERING, JENTSCHURA & PARTNER mbB (57) ABSTRACT

Disclosed is a print head cleaning device for a 3D printer configured to build a component in layers by means of binder jetting, the print head cleaning device comprising a cleaning agent feeding device having an elongated output opening and configured to output liquid cleaning agent through the elongated output opening, and a suction device having an elongated suction gap and configured to suction fluid through the elongated suction gap, wherein a longitudinal axis of the elongated output opening and a longitudinal (Continued)

axis of the elongated suction gap are arranged at an angle to each other.

19 Claims, 8 Drawing Sheets

(51) Int. Cl.
| | |
|---|---|
| B22F 12/53 | (2021.01) |
| B29C 64/165 | (2017.01) |
| B29C 64/209 | (2017.01) |
| B29C 64/35 | (2017.01) |
| B33Y 40/00 | (2020.01) |
| B33Y 30/00 | (2015.01) |

(52) U.S. Cl.
CPC .......... *B29C 64/209* (2017.08); *B29C 64/35* (2017.08); *B33Y 40/00* (2014.12); *B33Y 30/00* (2014.12)

(56) References Cited

U.S. PATENT DOCUMENTS

| | | |
|---|---|---|
| 2005/0280185 A1 | 12/2005 | Russell et al. |
| 2006/0061613 A1 | 3/2006 | Fienup et al. |
| 2013/0000553 A1 | 1/2013 | Hoechsmann et al. |
| 2019/0105836 A1 | 4/2019 | Lan et al. |
| 2020/0055246 A1 | 2/2020 | Günther et al. |

FOREIGN PATENT DOCUMENTS

| | | |
|---|---|---|
| DE | 102009056695 A1 | 6/2011 |
| DE | 102016013610 A1 | 5/2018 |
| EP | 1002649 A2 | 5/2000 |
| JP | 2007503342 A | 2/2007 |
| JP | 2008302701 A | 12/2008 |
| JP | 2013047003 A | 3/2013 |
| JP | 2017007321 A | 1/2017 |
| WO | 2004106041 A2 | 12/2004 |
| WO | 2016143942 A1 | 9/2016 |

OTHER PUBLICATIONS

Search Report issued for the corresponding German Patent Application No. 20 2019 102 983.8, dated Feb. 7, 2020, 3 pages (for informational purposes only).

Notice of Reasons for Refusal for the corresponding JP patent application No. 2021-570532, mailed on Nov. 15, 2022, 4pages (For informational purposes only).

Search Report for Refusal for the corresponding JP patent application No. 2021-570532, communicated on Nov. 2, 2022, 37pages (For informational purposes only).

PRINTHEAD CLEANING DEVICE FOR A 3D PRINTER, 3D PRINTER COMPRISING A PRINTHEAD CLEANING DEVICE, USE OF THE PRINTHEAD CLEANING DEVICE AND METHOD FOR CLEANING A PRINTHEAD OF A 3D PRINTER

The present invention relates to a print head cleaning device for a 3D printer configured to build a component in layers by means of binder jetting, and to a 3D printer configured to build a component in layers by means of binder jetting, comprising a print head cleaning device. Furthermore, the present invention relates to the use of the print head cleaning device and to a method of cleaning a print head of a 3D printer.

Various generative manufacturing processes and 3D printing processes, respectively, (and consequently various types of 3D printers, i.e. machines/equipment for building up a component in layers) are known.

Some generative manufacturing processes have the following steps in common:
(1) First, particulate material (or particulate construction material) is applied over an entire surface of/continuously on a construction field, so as to form a layer of unsolidified particulate material.
(2) The applied layer of unsolidified particulate material is selectively solidified in a predetermined partial area (in accordance with the component to be manufactured), for example by selectively printing a (for example liquid) treatment agent, for example a binding agent, for example a binder.
(3) Steps (1) and (2) are repeated to manufacture a desired component. For this purpose, a construction platform on which the component is built up in layers may, for example, be lowered by respectively one layer thickness before a new layer is applied (alternatively, a/the coater and a/the printing device may, for example, be raised by respectively one layer thickness).
(4) Finally, the manufactured component which is formed by the solidified partial areas and is supported and surrounded by loose, unsolidified particulate material may be unpacked.

A/the construction space in which the component or the components is/are manufactured may, for example, be defined by a so-called construction box (also referred to as job box or interchangeable container). A construction box of this type may have a circumferential wall structure which is open in an upward direction and extends in a vertical direction (for example formed by four vertical side walls), which may, for example, be formed to be rectangular when viewed from above. A height-adjustable construction platform may be received in the construction box. In this respect, the space above the construction platform and between the vertical circumferential wall structure may for example at least contribute to forming the construction space. An upper area of the construction space may, for example, be referred to as a construction field.

Building up one or more three-dimensional components in a/the construction space in layers may, for example, take place by selectively solidifying several adjacent particulate material layers in a respective partial area thereof, for example by binder jetting, i.e. by (selective) "bonding" of the (particulate) construction material with a (for example liquid) treatment agent, for example binding agent, for example binder.

In the above step (1), a coater (also referred to as a recoater) is usually used. Different coaters are known for use in a 3D printer, by means of which a particulate construction material can be applied in the form of a uniform, full-area/continuous layer to the construction field (also referred to as construction surface or construction area).

One type of coater uses a roller (in short: "roller coater"), in front of which a quantity of particulate construction material is first deposited and which is then moved horizontally across the construction field to apply the particulate construction material to the construction field in the form of a uniform layer. The roller can be rotated in the opposite direction in this regard.

Another kind of coater (a so-called "container coater", for example a "slot coater") uses a container which defines an inner cavity for receiving particulate construction material, and has an (for example elongate) output area, for example comprising an (for example elongate) output slot for outputting the particulate construction material. The container coater may, for example, be movable across a/the construction field (for example horizontally, for example transverse to its longitudinal direction), wherein the particulate construction material can be output onto the construction field through the (elongate) output area to thereby apply a uniform, full-area/continuous particulate material layer on the construction field and the construction platform, respectively. The coater may be elongate, for example, to span or to cover the length or width of a rectangular construction field.

In the above step (2), a printing device having a print head may for example be used, which applies a (for example liquid) treatment agent in a controlled way onto a partial area of a/the construction material layer applied before (so-called "binder jetting"). The treatment agent contributes to a (direct and/or later) solidification of the construction material layer in the partial area. For example, the treatment agent may be/contain a binding agent, for example binder, for example a binder component of a multicomponent binder.

The treatment agent to be printed may be viscous, for example, and/or may, under certain circumstances, adhere for example to a treatment agent output area of the print head, for example to nozzle orifices of the print head and/or to a/the print head underside. Similarly, swirled particulate material or dirt particles may adhere to the treatment agent output area, for example to the print head underside.

Such deposits/adhesions of treatment agent and/or particulate material to the treatment agent output area may, for example, affect the discharge of treatment agent, for example, the discharge of treatment agent drops from nozzle orifices. For example, deflection and/or deformation of the binder drops may occur. In addition, for example, the uppermost particulate material layer may be at least partially destroyed by the deposits/adhesions. Thus, for example, the quality of the manufactured components may be deteriorated by the deposits/adhesions.

Thus, it may be necessary to (regularly) clean the treatment agent output area of the print head, for example the print head underside, for example the side of the print head facing the construction platform, for example the nozzles arranged on the underside of the print head.

From DE 10 2009 056 695 A1 a print head cleaning device for a 3D printer is known, which is configured to build a component in layers by means of binder jetting, wherein the print head cleaning device comprises a wiping member with two wiper lips for wiping the underside of the print head.

It may be regarded as an object of the present invention to provide an (alternative) print head cleaning device for a 3D printer and a 3D printer, by means of which a component may be reliably manufactured by 3D printing by means of binder jetting.

Alternatively or in addition, it may be regarded as an object of the present invention to provide a print head cleaning device for a 3D printer and a 3D printer, by means of which a treatment agent output area of a print head may be cleaned in a simple and/or efficient manner.

Alternatively or in addition, it may be regarded as an object of the present invention to provide a use of the print head cleaning device and a method of cleaning a print head of a 3D printer, by means of which a component may be reliably manufactured by 3D printing by means of binder jetting and/or by means of which a treatment agent output area of a print head may be cleaned in a simple and/or efficient manner.

According to a first aspect of the invention, a print head cleaning device for a 3D printer configured to build a component by means of binder jetting (i.e., by controlled application of (for example liquid) treatment agent, for example binding agent, for example binder, to a partial area of a previously applied particulate material layer) in layers, has a cleaning agent feeding device comprising an elongated output opening and configured to output (for example upwardly) liquid cleaning agent through the elongated output opening (for example in a way that a cleaning agent wall, for example formed by the liquid cleaning agent, is formed), and a suction device comprising an elongated suction gap and configured to suction fluid (for example comprising the liquid cleaning agent and air) through the elongated suction gap, wherein a longitudinal axis of the elongated output opening and a longitudinal axis of the elongated suction gap are arranged at an angle (for example different from 0°) to each other.

By means of the cleaning agent feeding device, for example, a cleaning agent can be fed to a/the print head, for example to a/the treatment agent output area of a/the print head, which cleaning agent may, for example, moisten and/or (partially) dissolve and/or swell and/or emulsify deposits and/or contaminants adhering to the print head, for example treatment agent and/or particulate material, as a result of which the adhering deposits and/or contaminants can be easily and reliably removed. By means of the suction device, for example, deposits or contaminants adhering to the print head may be easily and reliably removed, for example suctioned off, in particular if the deposits or contaminants are moistened and/or (partially) dissolved and/or swollen and/or emulsified. In addition, for example, the print head may be dried quickly and reliably by the suction device, so that printing can be performed immediately after cleaning. Surprisingly, it was found that an arrangement of the longitudinal axis of the elongated output opening and the longitudinal axis of the elongated suction gap at an angle to each other is particularly advantageous. This makes it possible, for example, in an altogether compact and/or simple manner, for the longitudinal axis of the elongated suction gap to be traversed by the print head at an angle of not equal to 90°, which in turn makes it possible to remove adhering deposits or contaminants in a particularly reliable way. Since the print head cleaning device can do without mechanical wiping members (and preferably does not comprise any mechanical wiping members), maintenance work (for example, a replacement of wiping members) may be reduced. Furthermore, a cleaning agent may be arbitrarily selected without regard to a composition of the wiping member. Thus, the print head can be cleaned in a simple yet efficient and reliable manner. In addition, components can be reliably manufactured by 3D printing by means of binder jetting.

The liquid cleaning agent may be, for example, an aqueous cleaning agent, for example, an aqueous cleaning liquid. For example, the liquid cleaning agent may be an aqueous solution of a cleaning agent, for example, an aqueous solution of a cleaning agent component, for example, an aqueous solution of a surfactant, for example, an aqueous surfactant solution. The liquid cleaning agent may comprise, for example, water and a cleaning agent, for example, water and a cleaning agent component, for example, water and a surfactant. The liquid cleaning agent may be, for example, a water-based cleaning agent, for example, comprising water and a cleaning agent, for example, a cleaning agent component, for example, a surfactant. The liquid cleaning agent may comprise, for example, at least one alcohol. The liquid cleaning agent may be configured, for example, to dissolve or emulsify therein a/the treatment agent (for example, binding agent, for example binder). The treatment agent (or components thereof) may, for example, be soluble in the liquid cleaning agent, i.e., the treatment agent (or components thereof) and the liquid cleaning agent may, for example, form a solution. The treatment agent (or components thereof) may, for example, be emulsifiable in the liquid cleaning agent, i.e., the treatment agent (or components thereof) and the liquid cleaning agent may, for example, form an emulsion.

The cleaning agent feeding device may be configured, for example, to output liquid cleaning agent through the elongated output opening so as to form a cleaning agent wall. The cleaning agent wall may, for example, be formed by the liquid cleaning agent. The cleaning agent wall may, for example, have a height (for example, measured from the output opening) of less than or equal to 3 cm, for example, less than or equal to 2.5 cm, for example, less than or equal to 2 cm, for example, less than or equal to 1.5 cm, for example, less than or equal to 1 cm, for example, less than or equal to 0.5 cm.

The cleaning agent feeding device may be configured, for example, to output liquid cleaning agent upwardly through the elongated output opening, for example vertically upwardly, for example toward a print head arranged or arrangeable above the print head cleaning device. The cleaning agent feeding device may be configured, for example, to feed liquid cleaning agent to a treatment agent output area of a/the print head, for example, when the print head is arranged above the print head cleaning device, for example, the cleaning agent feeding device, for example, the elongated output opening.

The cleaning agent feeding device may further comprise, for example, a cleaning agent feed pump configured to output the liquid cleaning agent through the elongated output opening.

The fluid may comprise, for example, the liquid cleaning agent and air. The fluid may comprise, for example, a/the treatment agent, for example treatment agent removed from a/the print head. The fluid may comprise, for example, particulate material, for example particulate material removed from a/the print head.

The elongated output opening may have, for example, a (for example, constant) width in a range of 0.5 to 5 cm, for example in a range of 0.5 to 4 cm, for example in a range of 0.5 to 3 cm, for example in a range of 1 to 2 cm, for example 1.5 cm. The elongated output opening may have, for example, a length at least as long as or greater than the length of an/the elongated treatment agent output area of a/the print head. For example, the elongated output opening may have a length that is at least 5 mm greater, for example at least 10 mm greater, for example at least 15 mm greater, for example at least 20 mm greater, for example at least 30 mm greater, than the length and/or width of a/the (for example elongated) treatment agent output area of a/the print head.

The angle may, for example, be greater than 0°. The angle may be, for example, less than 90°. The angle may, for example, have a value that is in a range from 20 to 60°, for example in a range from 25 to 55°, for example in a range from 30 to 50°, for example in a range from 35 to 45°. The angle may be 40°, for example. This allows, for example, deposits or contaminants adhering to the print head, such as treatment agent and/or particulate material, to be removed in a particularly easy and reliable way.

The cleaning agent feeding device may, for example, comprise an elongated recess opening into the elongated output opening and in which a plurality of nozzles are arranged, each of which is configured to output liquid cleaning agent. The cleaning agent feed pump may, for example, be configured to feed liquid cleaning agent to the nozzles. The elongated recess may, for example, have a depth, for example a downward extension, of less than or equal to 15 mm, for example less than or equal to 10 mm, for example less than or equal to 5 mm. For example, the elongated recess may have a width that corresponds to the width of the elongated output opening, for example to the width specified above. The elongated recess may have, for example, a length that corresponds to the length of the elongated output opening, for example the length indicated above. Each of the nozzles may be configured, for example, to output a cleaning agent jet (for example, by outputting the cleaning agent from a nozzle orifice), for example, such that the cleaning agent wall is formed by a/the plurality of cleaning agent jets. The plurality of nozzles may, for example, be arranged in at least one (for example, linear, for example, straight) row that is parallel to the longitudinal axis of the elongated output opening. The plurality of nozzles may be arranged, for example, in at least one straight line that is parallel to the longitudinal axis of the elongated output opening. For example, the plurality of nozzles may be arranged in two parallel (for example, linear, for example, straight) rows that are parallel to the longitudinal axis of the elongated output opening. If the plurality of nozzles are arranged in two parallel rows, the nozzles of one (first) row may, for example, be offset from the nozzles of the other (second) row in the direction of the longitudinal axis of the elongated output opening. As a result, for example, the cleaning agent can be advantageously output and deposits or contaminants adhering to the print head, such as treatment agent and/or particulate material, can be removed, for example, in a particularly reliable way.

The elongated output opening may, for example, be surrounded, for example fully (along its full circumference) surrounded, by a groove. The groove may be configured, for example, to receive the liquid cleaning agent, for example, after it has flowed past and/or moistened a/the print head. For example, the groove may be configured to receive the cleaning agent output through the elongated output opening, for example after having flowed past the print head. The liquid cleaning agent may, for example, be output from the cleaning agent feeding device through the elongated output opening, flow past the print head and/or wash around or moisten a portion of the print head, and then be received by the groove. The liquid cleaning agent received by the groove may be discharged from the groove, for example through at least an opening provided in the bottom of the groove, for example by means of a cleaning agent discharge pump.

The suction device may, for example, comprise a recess which is covered in sections by a cover, for example a cover plate and/or a cover strip, thereby forming the suction gap. The cover, for example the cover plate and/or the cover strip, may for example be detachably attached to the print head cleaning device, for example by means of one or more screws.

The suction device may, for example, comprise a recess which is in fluid communication with the suction gap and in the bottom of which one or more suction openings, for example three suction openings, are provided for applying a vacuum. The vacuum may be generated, for example, by means of a vacuum pump. The suction device may, for example, comprise a/the vacuum pump. The suction device (for example, a/the vacuum pump thereof) may be configured, for example, to form at (for example in) the elongated suction gap a pressure of less than or equal to 900 mbar, for example less than or equal to 800 mbar, for example less than or equal to 700 mbar, for example less than or equal to 600 mbar, for example less than or equal to 500 mbar, for example less than or equal to 400 mbar, for example less than or equal to 300 mbar, for example less than or equal to 200 mbar, for example less than or equal to 100 mbar.

The print head cleaning device may further comprise, for example, an inclined surface extending between the elongated output opening and the elongated suction gap and inclined upwardly in a direction from the elongated output opening to the elongated suction gap, for example with a slope that is in a range of 1 to 5%, for example in a range of 1.5 to 4%, for example in a range of 2 to 3%. The inclined surface may, for example, be at least co-formed, for example formed, by a plate. The inclined surface may be, for example, a flat surface. The slope of the inclined surface may, for example, be (substantially) constant. The inclined surface may, for example, extend between the groove and the elongated suction gap. The inclined surface may, for example, be configured to be (substantially) triangular in shape. This allows, for example, materials or substances (for example cleaning agents) dripping from the print head between the elongated output opening and the elongated suction gap to be easily discharged.

For example, the suction gap may have a width (for example extension in a direction perpendicular to its longitudinal axis) of less than or equal to 5 mm, for example less than or equal to 4 mm, for example less than or equal to 3 mm, for example less than or equal to 2 mm, for example less than or equal to 1.5 mm, for example 1 mm. The width of the suction gap may, for example, be (substantially) constant. Thus, for example, an advantageous suction of fluid can be achieved.

The nozzles may, for example, each have at least a nozzle orifice for outputting liquid cleaning agent, the diameter of which is in a range from 1 to 5 mm, for example in a range from 1.5 to 3 mm, for example 2 mm. All of the nozzle orifices may, for example, have the same diameter. The nozzle orifices may be, for example, (substantially) circular. A nozzle density and/or a nozzle orifice density in the direction of the longitudinal axis of the elongated output opening may be, for example, in a range from 5 to 35 nozzles or nozzle orifices per 10 cm, for example in a range from 10 to 30 nozzles or nozzle orifices per 10 cm, for example in a range from 15 to 25 nozzles or nozzle orifices per 10 cm. A total of, for example, 10 to 200 nozzles and/or nozzle orifices may be provided.

The cover, for example the cover plate and/or the cover strip, may be curved, for example as viewed in section, for example in a cross-section perpendicular to a longitudinal extension thereof, for example in a cross-section perpendicular to the longitudinal axis of the suction gap. The recess may comprise a curved portion disposed adjacent to the suction gap, for example as viewed in section, for example in a cross-section perpendicular to a longitudinal extension thereof, for example in a cross-section perpendicular to the longitudinal axis of the suction gap. This can, for example, improve the flow of fluid passing through the elongated suction gap, whereby, for example, deposits or contaminants adhering to the print head, such as treatment agent and/or particulate material, can be removed in a particularly easy and reliable way.

The print head cleaning device may, for example, be configured (and/or arranged) such that a/the print head is movable across the output opening and/or the suction gap at a distance that is in a range of 0.5 to 10 mm, for example in a range of 1 to 5 mm, for example in a range of 1.5 to 4 mm, for example in a range of 2 to 3 mm. As a result, for example, deposits or contaminants adhering to the print head, such as treatment agents and/or particulate material, can be removed in a particularly easy and reliable way.

The print head cleaning device and/or the 3D printer (for example, the 3D printer described below according to the second and/or third aspects) may, for example, comprise a control device configured to move a/the print head of the 3D printer (for example, in a controlled manner) (for example, first) across the cleaning agent feeding device (for example, the elongated output opening thereof) and (for example, subsequently) across the suction device (for example, the elongated suction gap thereof), for example in a way that a treatment agent output area of the print head is cleaned. For example, the control device may be configured to regularly (for example in a controlled manner, for example after a predetermined period of time has elapsed, for example after a predetermined amount of treatment agent has been dispensed, for example after a certain number of layers has been made) move the print head of the 3D printer across the print head cleaning device, for example so as to clean a/the treatment agent output area of the print head.

According to a second aspect of the invention, a 3D printer configured to build a component in layers by means of binder jetting (i.e., by controlled application of (for example liquid) treatment agent, for example binding agent, for example binder, to a partial area of a previously applied particulate material layer) has a print head for outputting (for example liquid) treatment agent, for example binding agent, for example binder, and a print head cleaning device, which may be formed, for example, as described above, for example according to the first aspect.

The 3D printer may further comprise, for example, an absorbent member, for example a sponge, disposed adjacent to the print head cleaning device, infiltratable with liquid, and dimensioned to correspond to a treatment agent output area of the print head, wherein the print head is movable to a parking position above the absorbent member. For example, the absorbent member may be arranged at any position in the 3D printer. By being arranged adjacent to the print head cleaning device, for example, a distance to be covered by the print head between the print head cleaning device and the parking position can be shortened.

For example, the print head may be movable in a first horizontal direction across a construction field of the 3D printer. For example, the print head may be movable in a first horizontal direction across a/the construction field of the 3D printer and may be able to be offset in a second horizontal direction to work through the construction field in a meandering manner. For example, the first horizontal direction may be perpendicular to the longitudinal axis of the elongated opening. The second horizontal direction may be, for example, parallel to the longitudinal axis of the elongated output opening.

The print head may be movable, for example, along a support structure in the first horizontal direction across the construction field and perpendicular to the longitudinal axis of the elongated output opening across the print head cleaning device.

For example, the print head may be movable across the output opening and/or the suction gap at a distance ranging from 0.5 to 10 mm, for example ranging from 1 to 7 mm, for example ranging from 1.5 to 5 mm, for example ranging from 2 to 3 mm. For example, the print head cleaning device and/or the 3D printer may comprise a device for adjusting the height of the print head cleaning device, for example to set the distance between the print head and the print head cleaning device. The device for adjusting the height of the print head cleaning device may be formed, for example, by three height setting elements.

The treatment agent output area of the print head may be elongated, for example, wherein the longitudinal axis of the treatment agent output area is arranged perpendicular to the first horizontal direction and/or is parallel to the longitudinal axis of the output opening.

According to a third aspect of the invention, a 3D printer configured to build a component in layers by means of binder jetting has a print head for outputting treatment agent, which is movable in a first horizontal direction across a construction field of the 3D printer and optionally can be offset in a second horizontal direction in order to work through the construction field in a meandering manner, and a print head cleaning device having a cleaning agent feeding device (which may be configured, for example, as described above for the first aspect), which is configured to feed liquid cleaning agent to a treatment agent output area of the print head, and a suction device (which may be configured, for example, as described above for the first aspect) which has an elongated suction gap and is configured to suction fluid through the elongated suction gap, the first horizontal direction and/or a travel direction of the print head being arranged at an angle of less than/not equal to 90° (and, for example, greater than 0°) with respect to a longitudinal axis of the elongated suction gap.

By feeding the liquid cleaning agent to the treatment agent output area of the print head, for example, deposits or contaminants adhering to the treatment agent output area, for example treatment agent and/or particulate material, can be moistened and/or (partially) dissolved and/or swollen and/or emulsified, whereby the adhering deposits or contaminants can be easily and reliably removed. By means of the suction device, for example, deposits or contaminants adhering to the print head can be easily and reliably removed, for example suctioned off, in particular if the deposits or contaminants have previously been moistened and/or (partially) dissolved and/or swollen and/or emulsified. Surprisingly, it was found that deposits or contaminants adhering to the print head can be removed particularly reliably if the first horizontal direction and/or direction of travel of the print head is arranged at an angle of not equal to 90° to a longitudinal axis of the elongated suction gap. Thus, the print head can be cleaned in a simple yet efficient and reliable manner. In addition, components can be reliably manufactured by 3D printing by means of binder jetting.

For example, a longitudinal axis of an elongated output opening of the cleaning agent feeding device (for example configured according to the first aspect) and the longitudinal axis of the elongated suction gap of the suction device (for example configured according to the first aspect) may be arranged (substantially) parallel to each other. However, an embodiment according to the first and/or second aspect, wherein an angle is formed by the two longitudinal axes, may for example have an advantage over a parallel configuration of the third aspect in that a length of the elongated output opening of the cleaning agent feeding device and thus a number of nozzles may be reduced, whereby for example nozzles may be saved.

According to a fourth aspect of the invention, the print head cleaning device described above, for example the print head cleaning device according to the first aspect, may be used for cleaning a print head of a 3D printer. The print head may be, for example, a print head for outputting (for example liquid) treatment agent (for example binding agent, for example binder). For example, the print head may be a binder jetting print head. The 3D printer may be configured, for example, to build a component in layers by means of binder jetting.

The above-described print head cleaning device, for example the print head cleaning device according to the first aspect, may be used, for example, to clean a treatment agent output area of the print head and/or to clean a print head underside and/or to clean nozzles disposed on the underside of the print head.

The print head cleaning device described above, for example the print head cleaning device according to the first aspect, may be used for example for removing deposits and/or contaminants adhering to the print head, for example adhering to a treatment agent output area of the print head, for example adhering to an underside of the print head. The deposits and/or contaminants may comprise, for example, treatment agent (for example binding agent, for example binder) and/or particulate material (for example construction material).

According to a fifth aspect of the invention, a method of cleaning a print head (for example a print head for outputting treatment agent, for example a binder jetting print head) of a 3D printer (for example a 3D printer configured to build a component in layers by means of binder jetting) may comprise the steps of: providing the print head cleaning device described above, for example the print head cleaning device according to the first aspect, and moving the print head across the print head cleaning device.

For example, the print head may be moved across the print head cleaning device such that the direction of movement of the print head is arranged at an angle of 90° (or perpendicular) to the longitudinal axis of the elongated output opening.

For example, the print head may be moved across the print head cleaning device such that the direction of movement of the print head is arranged at an angle of less than 90° to the longitudinal axis of the elongated suction gap. For example, the direction of movement of the print head and the longitudinal axis of the elongated suction gap may be arranged at an angle of 30° to 70°, for example 35° to 65°, for example 40° to 60°, for example 45° to 55°, for example 50°, with respect to each other.

According to a sixth aspect of the invention, a method of cleaning a print head (for example a print head for outputting treatment agent, for example a binder jetting print head) of a 3D printer (for example a 3D printer configured to build a component in layers by means of binder jetting), wherein the print head is movable in a first horizontal direction across a construction field of the 3D printer (and optionally can be offset in a second horizontal direction in order to work through the construction field in a meandering and/or striped manner), may comprise the steps of: providing a print head cleaning device comprising (i) a cleaning agent feeding device configured to feed liquid cleaning agent to the print head (for example to a treatment agent output area of the print head), and (ii) a suction device comprising an elongated suction gap and configured to suction fluid through the elongated suction gap; and moving the print head across the print head cleaning device such that the first horizontal direction and/or a direction of movement of the print head across the print head cleaning device, in particular the suction gap thereof, is arranged at an angle of less than 90° to the longitudinal axis of the elongated suction gap.

In the methods described above, for example methods according to the fifth and/or sixth aspect, the print head may for example (first) be moved across the cleaning agent feeding device and subsequently be moved across the suction device. Furthermore, the print head may, for example, be moved across the suction device before being moved across the cleaning agent feeding device.

Furthermore, the print head may, for example, be moved across the print head cleaning device multiple times and/or may be moved across the cleaning agent feeding device multiple times and/or may be moved across the suction device multiple times.

Exemplary but non-limiting embodiments of the invention are shown in the Figures and are explained in more detail below.

In the following description, reference is made to the enclosed Figures which are incorporated therein and in which specific embodiments are shown by way of illustration, according to which the invention can be performed.

It shall be understood that other embodiments may be used and structural or logical changes may be made without deviating from the scope of protection of this invention. It shall be understood that the features of the embodiments described herein may be combined unless specified otherwise. Thus, the following description should not be understood in a restrictive sense and the scope of protection of this invention shall be defined by the attached claims.

In this description, terms such as "connected", "attached" and "coupled" may be used to describe both a direct and indirect connection, a direct or indirect attachment and a direct or indirect coupling.

In the Figures, identical or similar elements are provided with identical reference numbers where appropriate.

Figure 1:
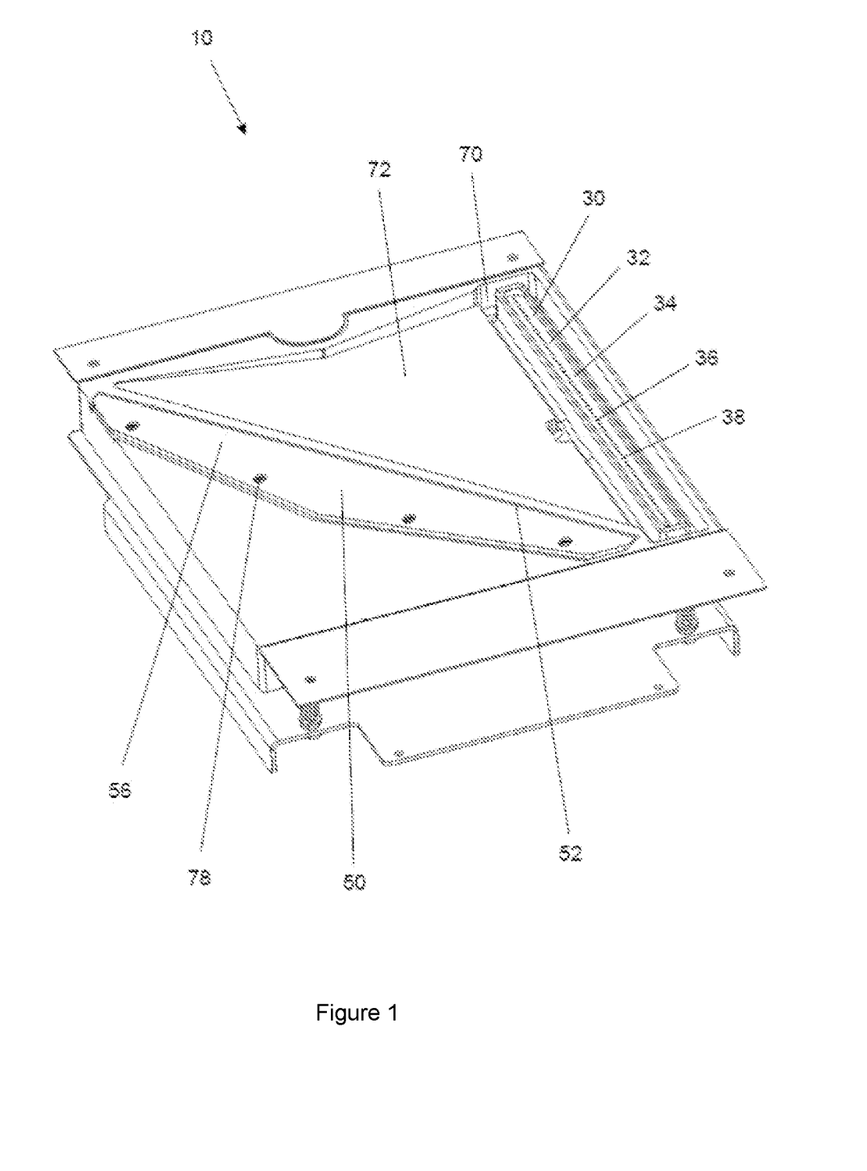
FIG. 1 shows a perspective view of a print head cleaning device for a 3D printer according to a first embodiment.
Figure 2:
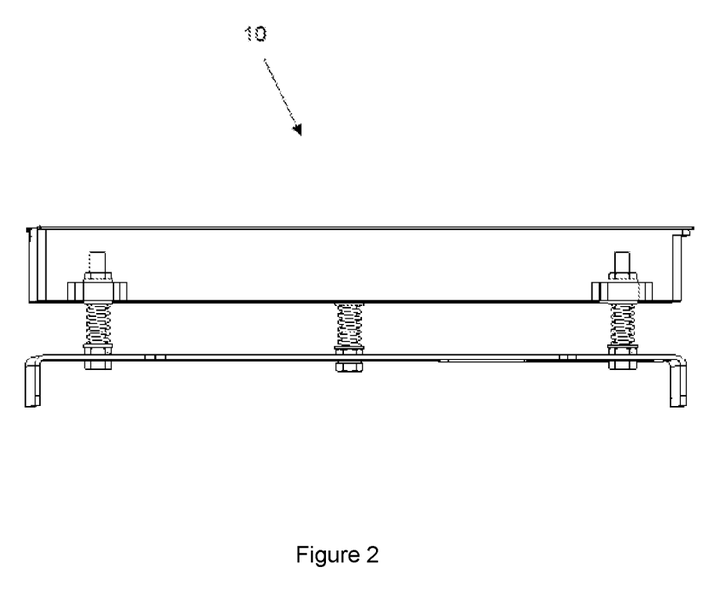
FIG. 2 shows a side view of the print head cleaning device for a 3D printer shown in FIG. 1.
Figure 3:
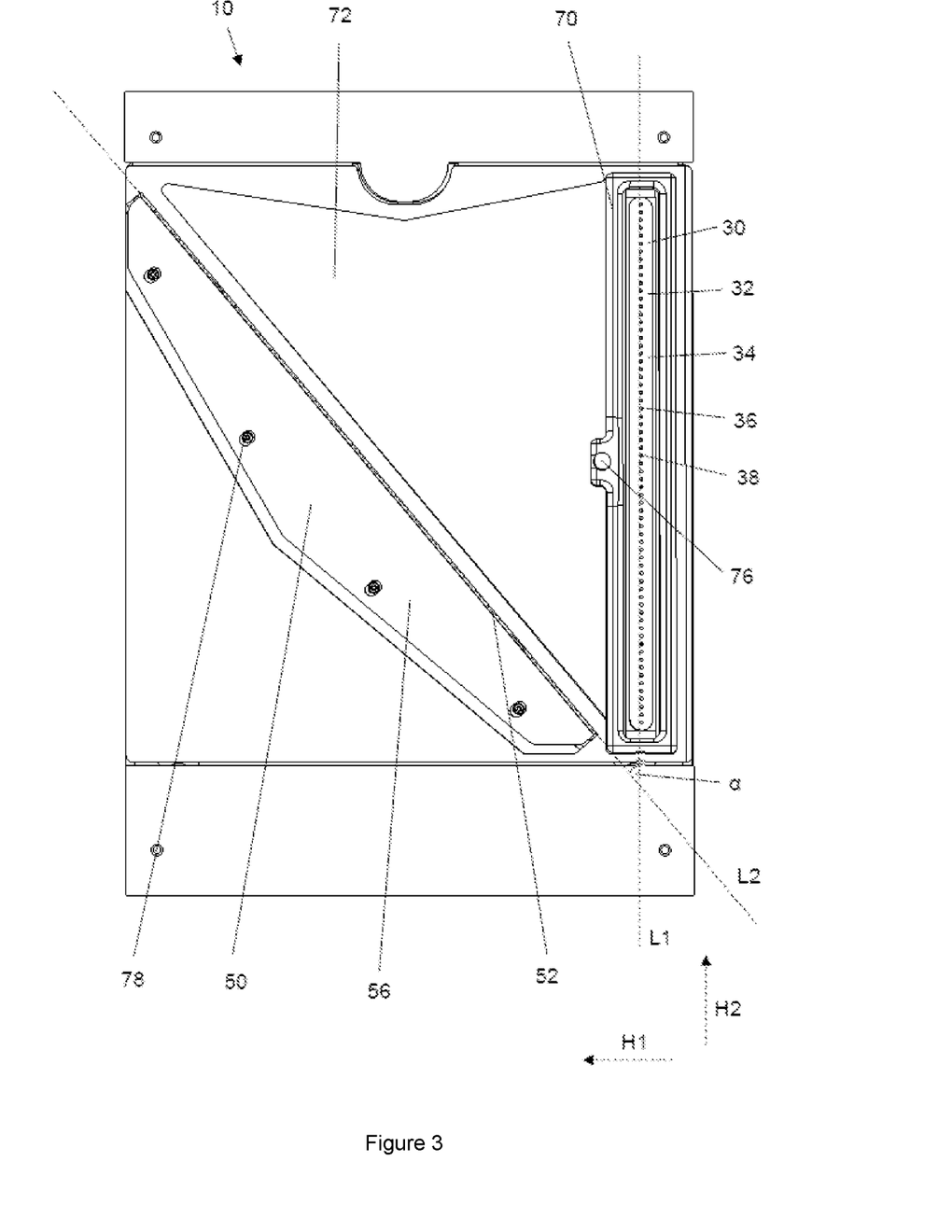
FIG. 3 shows a top view of the print head cleaning device for a 3D printer shown in FIG. 1.

As shown in FIGS. 1 to 7, a print head cleaning device 10 for a 3D printer configured to build a component in layers by means of binder jetting has, according to a first embodiment, a cleaning agent feeding device 30 comprising an elongated output opening 32 and configured to output liquid cleaning agent through the elongated output opening 32, and a suction device 50 having an elongated suction gap 52 and configured to suction fluid through the elongated suction gap 52, wherein a longitudinal axis L1 of the elongated output opening 32 and a longitudinal axis L2 of the elongated suction gap 52 are arranged at an angle α with respect to each other (see, for example, FIG. 3).

The angle α may be, for example, less than 90°. For example, the angle α may have a value that is in the range of 20 to 60°. For example, the angle α may be 40°.

Figure 4:
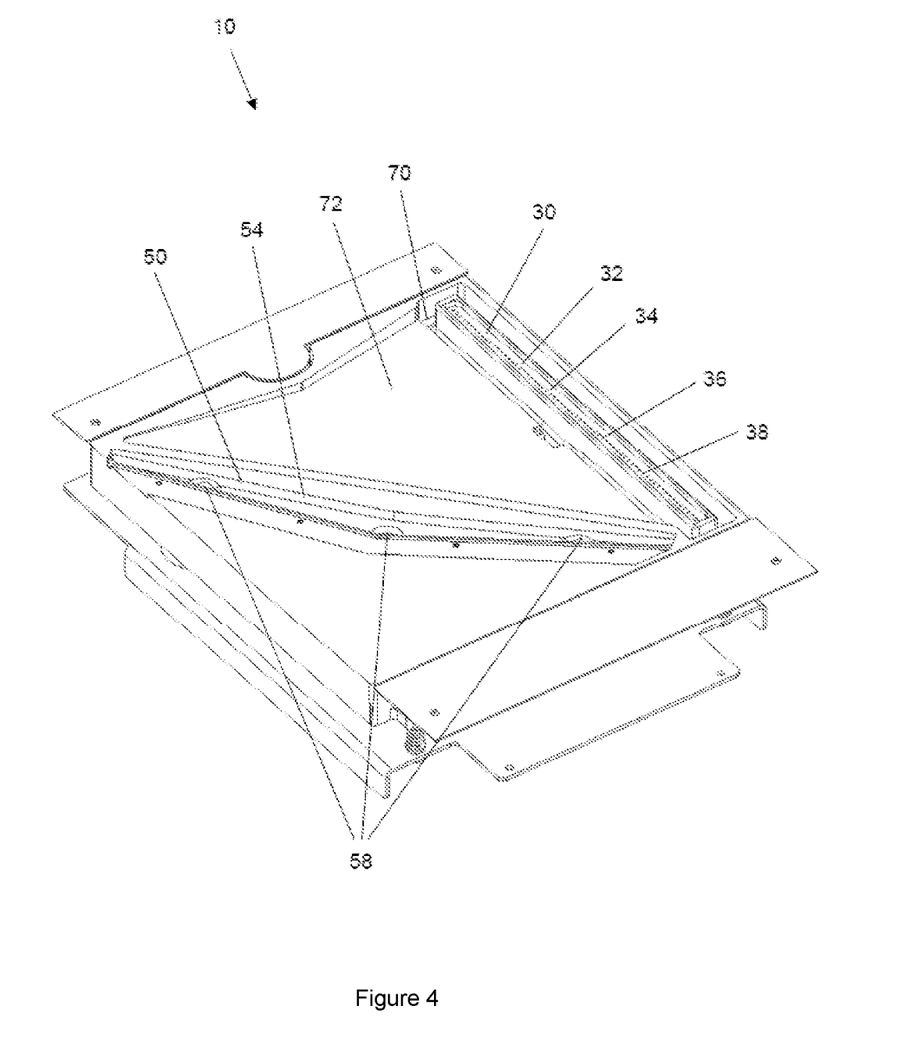
FIG. 4 shows a perspective view of the print head cleaning device for a 3D printer shown in FIG. 1, with a cover omitted.
Figure 5:
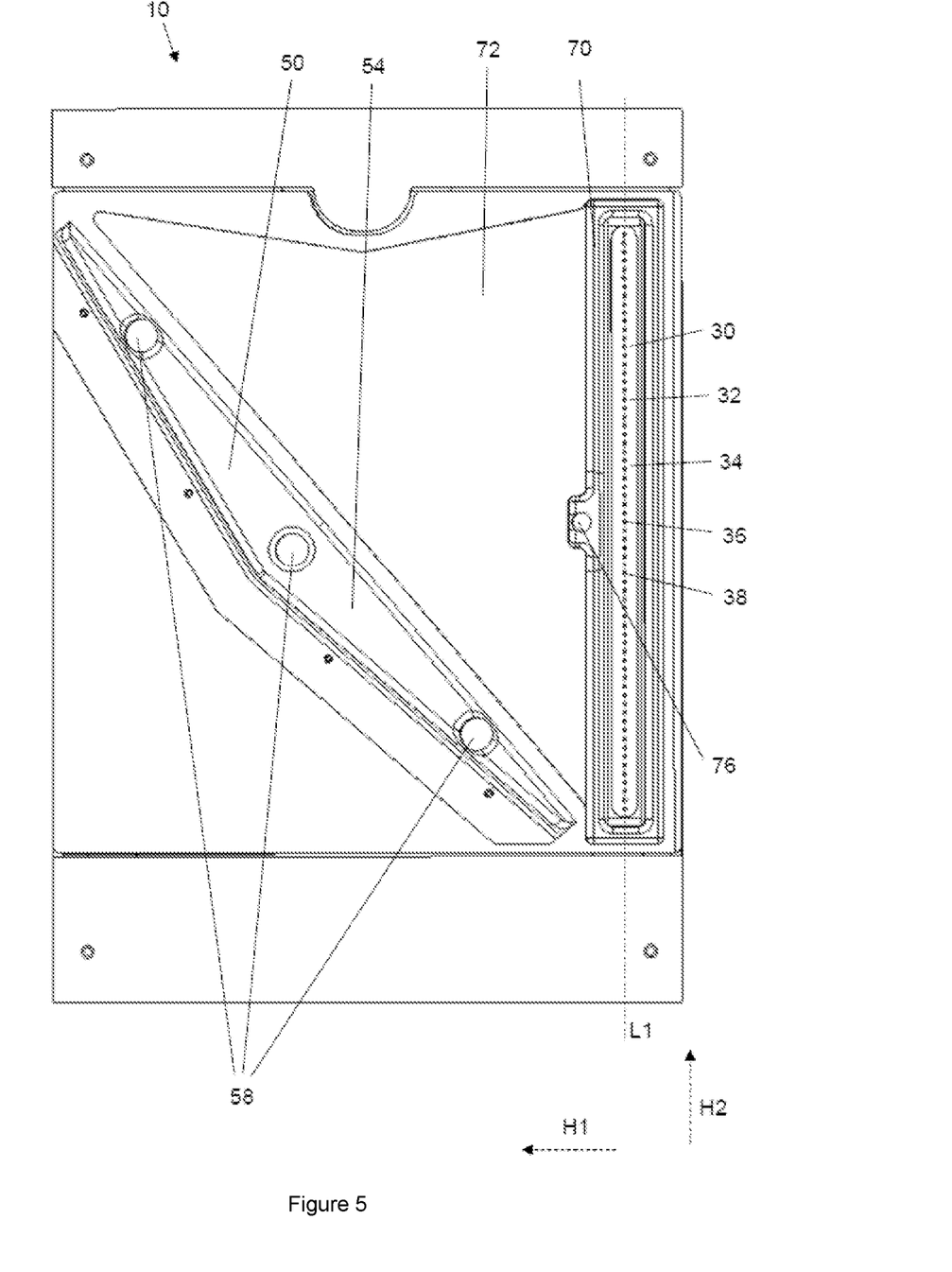
FIG. 5 shows a top view of the print head cleaning device for a 3D printer shown in FIG. 1, with the cover omitted.

The cleaning agent feeding device 30 may, for example, have an elongated recess 34 opening into the elongated output opening 32 and having disposed therein a plurality of nozzles 36, each configured to output liquid cleaning agent.

The plurality of nozzles 36 may be arranged, for example, in at least one row parallel to the longitudinal axis L1 of the elongated output opening 32. For example, the plurality of nozzles 36 may be arranged in exactly one linear and/or straight row that is parallel to the longitudinal axis L1 of the elongated output opening 32.

The elongated output opening 32 may, for example, be surrounded, for example fully surrounded by a groove 70. The liquid cleaning agent may, for example, be output from the cleaning agent feeding device 30 through the elongated output opening 32, flow past a/the print head and/or wash around and/or moisten a portion of a/the print head, may be received by the groove 70, and may be discharged through at least one opening 76 provided at the bottom of the groove.

The suction device 50 may, for example, comprise a recess 54 that is covered in sections by a cover 56, for example a cover plate and/or a cover strip, thereby forming the suction gap 52. The cover 56 may, for example, be detachably attached to the print head cleaning device 10, for example by means of one or more screws 78, for example by means of four screws 78. The suction device 50 may, for example, comprise a recess 54 which is in fluid communication with the suction gap 52 and in the bottom of which one or more suction openings 58, for example three suction openings 58, are provided for applying a vacuum.

The cleaning agent feeding device 30 may comprise, for example, a cleaning agent feed pump for outputting the liquid cleaning agent through the elongated output opening 32 or for outputting the liquid cleaning agent with the nozzles 36, for example through at least one nozzle orifice 38 of a respective nozzle 36. The suction device 50 may comprise, for example, a vacuum pump for applying a vacuum to the suction gap 52 and/or the recess 54 and/or the one or more suction openings 58. The print head cleaning device may, for example, comprise a cleaning agent discharge pump for discharging the cleaning agent from the grove 70 or through the at least one opening 76 provided at the bottom of the groove.

The print head cleaning device 10 may comprise, for example, an inclined surface 72 extending between the elongated output opening 32 and the elongated suction gap 52 and inclined upwardly in a direction from the elongated output opening 32 to the elongated suction gap 52, for example with a slope that is in a range of 2 to 5%. The inclined surface 72 may, for example, be configured to be at least substantially triangular in shape.

The suction gap 52 may have, for example, a width of less than or equal to 5 mm, for example a width in a range between 0.5 to 2 mm. For example, the suction gap may have at least a substantially constant width.

The nozzles 36 may, for example, each have at least one nozzle orifice 38 for outputting liquid cleaning agent, having a diameter in a range from 1 to 5 mm. For example, the nozzle orifices 38 may have a diameter of 2 mm. All nozzle orifices 38 may have the same diameter, for example. In the direction of the longitudinal axis L1 of the elongated output opening 32, for example over a length of 10 cm, an average of 5 to 35 nozzles or nozzle orifices may be arranged, for example 15 to 25 nozzles or nozzle orifices.

The cover 56, for example the cover plate and/or the cover strip, may be curved when viewed in section, for example in a cross-section perpendicular to a longitudinal extension thereof.

A 3D printer configured to build a component in layers by means of binder jetting, according to a second embodiment, has a print head for outputting treatment agent and a print head cleaning device 10, which may be configured, for example, as described above for the first embodiment, for example be configured according the first embodiment.

Figure 6:
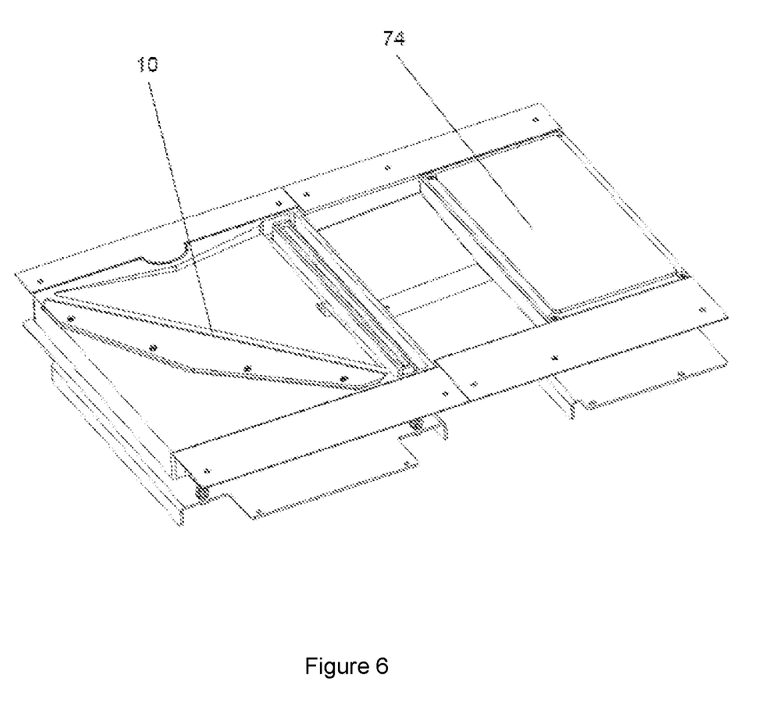
FIG. 6 shows a perspective view of a print head cleaning device for a 3D printer according to the first embodiment in combination with an absorbent member disposed adjacent to the print head cleaning device.
Figure 7:
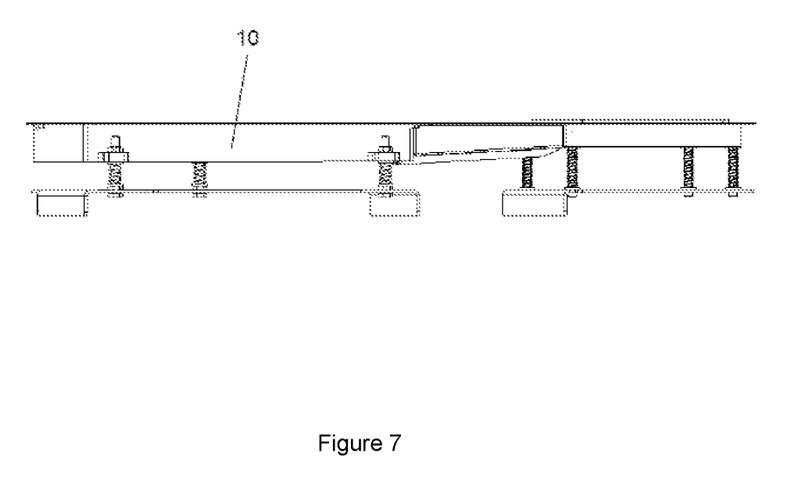
FIG. 7 shows a side view of the print head cleaning device for a 3D printer shown in FIG. 6 in combination with the absorbent member disposed adjacent to the print head cleaning device.

The 3D printer may for example comprise an absorbent member 74, for example a sponge, disposed adjacent to the print head cleaning device 10, infiltratable with fluid, and dimensioned to correspond to a treatment agent output area of the print head. The print head may, for example, be movable to a parking position above the absorbent member 74.

The print head may, for example, be movable in a first horizontal direction H1 across a construction field of the 3D printer and optionally can be offset in a second horizontal direction H2 to work through the construction field in a meandering manner, wherein the first horizontal direction H1 is perpendicular to the longitudinal axis L1 of the elongated output opening 32 and/or the second horizontal direction H2 is parallel to the longitudinal axis L1 of the elongated output opening 32.

For example, the print head may be movable along a support structure in the first horizontal direction H1 across the construction field and perpendicular to the longitudinal axis L1 of the elongated output opening 32 across the cleaning device.

For example, the treatment agent output area of the print head may be configured to be elongated, wherein the longitudinal axis of the treatment agent output area is arranged perpendicular to the first horizontal direction H1 and/or is parallel to the longitudinal axis L1 of the elongated output opening 32.

Figure 8:
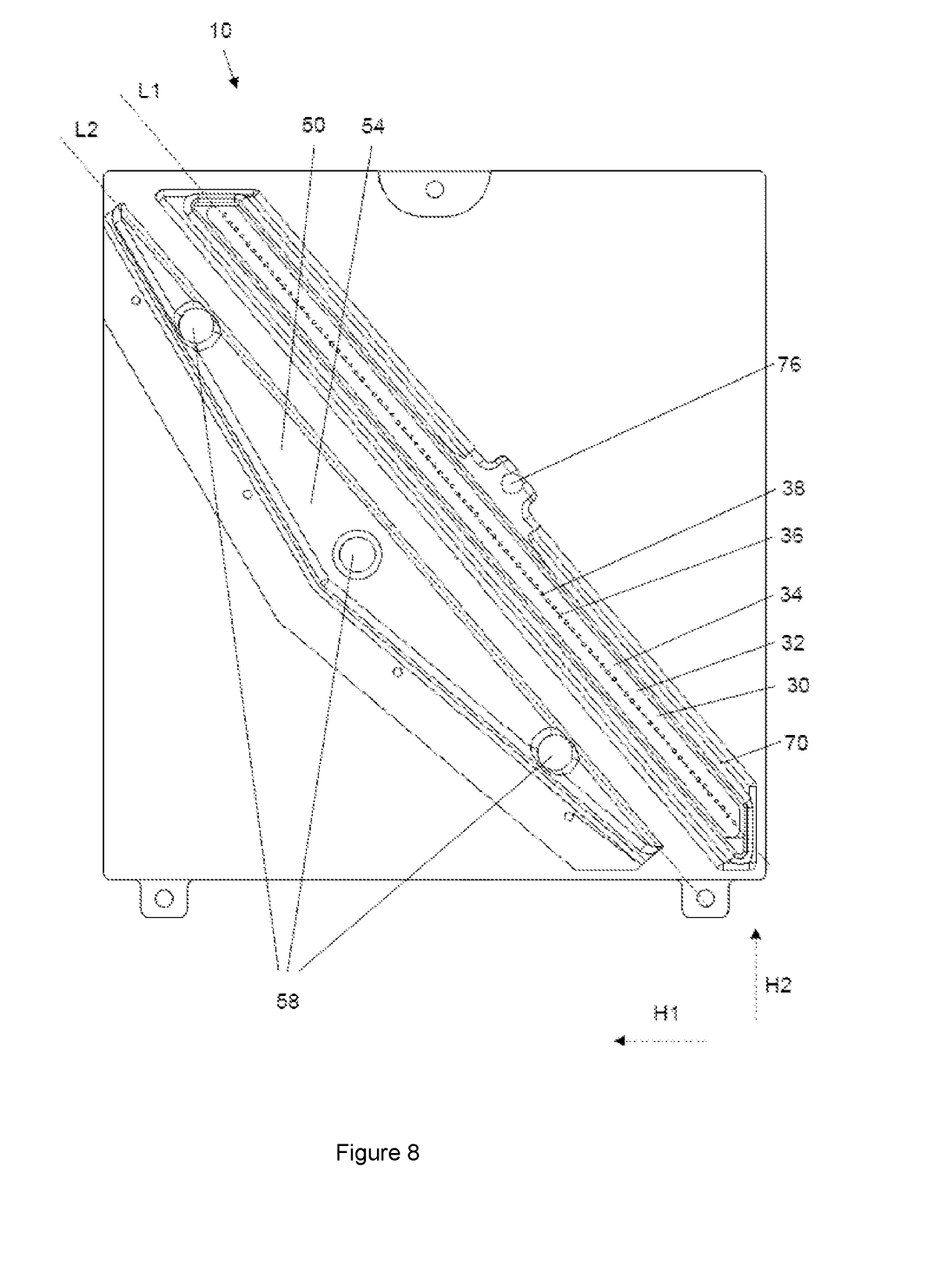
FIG. 8 shows a top view of a print head cleaning device for a 3D printer used in a 3D printer according to a third embodiment, wherein a cover of the print head cleaning device is omitted.

A 3D printer configured to build a component in layers by means of binder jetting, according to a third embodiment, has a print head for outputting treatment agent, which is movable in a first horizontal direction H1 across a construction field of the 3D printer and can optionally be offset in a second horizontal direction H2 in order to work through the construction field in a meandering manner, and a print head cleaning device 10 comprising a cleaning agent feeding device 30 configured to feed liquid cleaning agent to a treatment agent output area of the print head, and an suction device 50 comprising an elongated suction gap 52 and configured to suction fluid through the elongated suction gap 52, wherein the first horizontal direction H1 or a direction of travel of the print head across the print head cleaning device is arranged at an angle of less than/not equal to 90° to a longitudinal axis L2 of the elongated suction gap 52.

As shown in FIG. 8, the cleaning agent feeding device 30 and/or the suction device 50 of the print head cleaning device 10 used in the 3D printer according to the third embodiment may, for example, be configured basically as described above for the first and/or second embodiment, wherein, for example, a longitudinal axis L1 of the elongated output opening 32 and the longitudinal axis L2 of the elongated suction gap 52 may be arranged substantially parallel to each other.

Thus, the print head cleaning device 10 used in the 3D printer according to the third embodiment may comprise, for example, a cleaning agent feeding device 30 comprising an elongated output opening 32 and configured to output liquid cleaning agent through the elongated output opening 32, and a suction device 50 comprising an elongated suction gap 52 and configured to suction fluid through the elongated suction gap 52, wherein the longitudinal axis of the elongated output opening and the longitudinal axis of the elongated suction gap are arranged parallel to each other.

The invention claimed is:

1. A print head cleaning device for a 3D printer configured to build a component in layers by means of binder jetting, the print head cleaning device comprising:
    a cleaning agent feeding device comprising an elongated output opening and configured to output liquid cleaning agent through the elongated output opening, and
    a suction device comprising an elongated suction gap and configured to suction fluid through the elongated suction gap,
    wherein a longitudinal axis of the elongated output opening and a longitudinal axis of the elongated suction gap are arranged at an angle to each other,
    wherein the angle is in the range of 20° to 60°.

2. The print head cleaning device for a 3D printer according to claim 1, wherein the angle is in the range of 30 to 50°.

3. The print head cleaning device for a 3D printer according to claim 1, wherein the cleaning agent feeding device comprises an elongated recess which opens into the elongated output opening and in which a plurality of nozzles are arranged, each configured to output liquid cleaning agent.

4. The print head cleaning device for a 3D printer according to claim 3, wherein the plurality of nozzles are arranged in at least one row that is parallel to the longitudinal axis of the elongated output opening.

5. The print head cleaning device for a 3D printer according to claim 1, wherein the elongated output opening is surrounded by a groove.

6. The print head cleaning device for a 3D printer according to claim 1, wherein the suction device comprises a recess which is covered by a cover so as to form the suction gap.

7. The print head cleaning device for a 3D printer according to claim 6, wherein the cover is detachably attached to the print head cleaning device.

8. The print head cleaning device for a 3D printer according to claim 1, wherein the suction device comprises a recess which is in fluid communication with the suction gap and in the bottom of which one or more suction openings are provided for applying a vacuum.

9. The print head cleaning device for a 3D printer according to claim 1, further comprising an inclined surface extending between the elongated output opening and the elongated suction gap and which is inclined upwardly in the direction from the elongated output opening to the elongated suction gap.

10. The print head cleaning device for a 3D printer according to claim 9, wherein the inclined surface is configured to be substantially triangular in shape.

11. The print head cleaning device for a 3D printer according to claim 1, wherein the suction gap has a width of less than or equal to 5 mm.

12. The print head cleaning device for a 3D printer according to claim 3, wherein the nozzles each have at least one nozzle orifice for outputting liquid cleaning agent, the diameter of which is in a range from 1 to 5 mm, and/or wherein in the direction of the longitudinal axis of the elongated output opening a nozzle density and/or nozzle orifice density is in a range from 5 to 35 nozzles or nozzle orifices per 10 cm.

13. The print head cleaning device (10) for a 3D printer according to claim 6, wherein the cover has a curved portion.

14. The print head cleaning device for a 3D printer according to claim 1, wherein the angle is in the range of 35° to 45°.

15. The print head cleaning device for a 3D printer according to claim 6, wherein the cover comprises a cover plate or a cover strip.

16. The print head cleaning device for a 3D printer according to claim 8, wherein the one or more suction openings comprise three suction openings.

17. The print head cleaning device for a 3D printer according to claim 9, wherein the slope is in a range of 2 to 3%.

18. The print head cleaning device for a 3D printer according to claim 11, wherein the suction gap has a width of less than or equal to 1.5 mm.

19. The print head cleaning device for a 3D printer according to claim 1, wherein the longitudinal axis of the elongated output opening and the longitudinal axis of the elongated suction gap are configured to be in a plane facing nozzle orifices of a print head of the 3D printer during cleaning.

* * * * *